United States Patent [19]

Jong-Hee et al.

[11] Patent Number: 5,620,619

[45] Date of Patent: Apr. 15, 1997

[54] WEAVER FOR A WELDING TORCH CAPABLE OF COMPATIBLY USING A STRAIGHT WEAVING AND AN ANGULAR WEAVING

[75] Inventors: Kim Jong-Hee; Kim Kyung-Seok, both of Ulsan-si, Rep. of Korea

[73] Assignee: Hyundai Heavy Industries Co., Ltd., Ulsan-si, Rep. of Korea

[21] Appl. No.: 568,117

[22] Filed: Dec. 6, 1995

[30] Foreign Application Priority Data

Dec. 17, 1994 [KR] Rep. of Korea ................... 94-34804

[51] Int. Cl.$^6$ ..................................................... B23K 9/12
[52] U.S. Cl. ............................................................ 219/125.12
[58] Field of Search ............................ 219/125.12, 125.1, 219/125.11, 136; 228/27

[56] References Cited

U.S. PATENT DOCUMENTS

| 3,571,557 | 3/1971 | Valentine | 219/125.12 |
| 4,292,495 | 9/1981 | Saito et al. | 219/125.12 |

FOREIGN PATENT DOCUMENTS

| 1116617 | 5/1985 | U.S.S.R. | 219/125.12 |
| 1194626 | 11/1985 | U.S.S.R. | 219/125.12 |

*Primary Examiner*—Clifford C. Shaw
*Attorney, Agent, or Firm*—Armstrong, Westerman, Hattori, McLeland & Naughton

[57] ABSTRACT

A weaver for a welding torch required for executing right and left weaving works of welding torch which has been executed by a welding operator for automating the welding work as an automatic welding apparatus so as to execute both straight weaving and angular weaving.

2 Claims, 8 Drawing Sheets

PRIOR ART

FIG. 6(b)

PRIOR ART

STRAIGHT WEAVING

FIG. 8(A)

ANGLE WEAVING

WEAVER FOR A WELDING TORCH CAPABLE OF COMPATIBLY USING A STRAIGHT WEAVING AND AN ANGULAR WEAVING

BACKGROUND OF THE INVENTION

The present invention relates to a weaver for a welding torch required for executing right and left weaving works of a welding torch which has been executed by a welding operator for automating the welding work as an automatic welding apparatus so as to execute both straight weaving and angular weaving.

As a weaver for a welding torch used in general, there are two kinds which are for straight weaving and for angular weaving. The straight weaving and angular weaving weaver are selectively used in accordance with each use (groove shape of welding portion) FIGS. 6(a) and 6(b) show a conventional general straight weaving weaver.

Figure 6A:
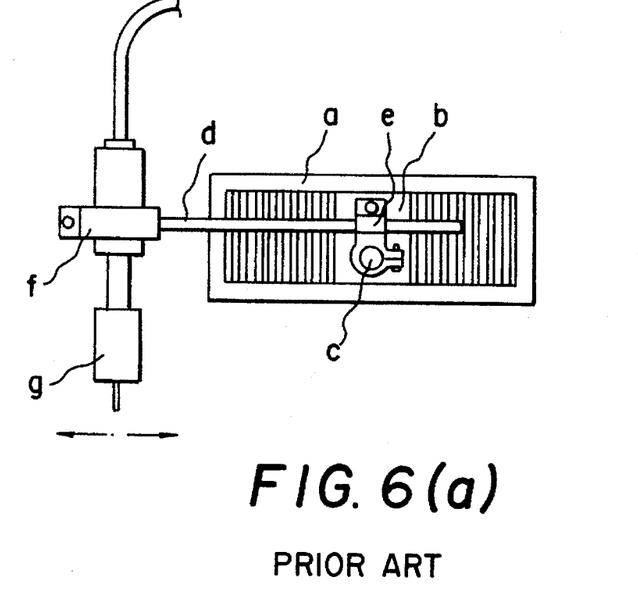
FIGS. 6(a) and 6(b) are front and plane views, respectively, showing a conventional straight weaving exclusive use device.
Figure 6B:
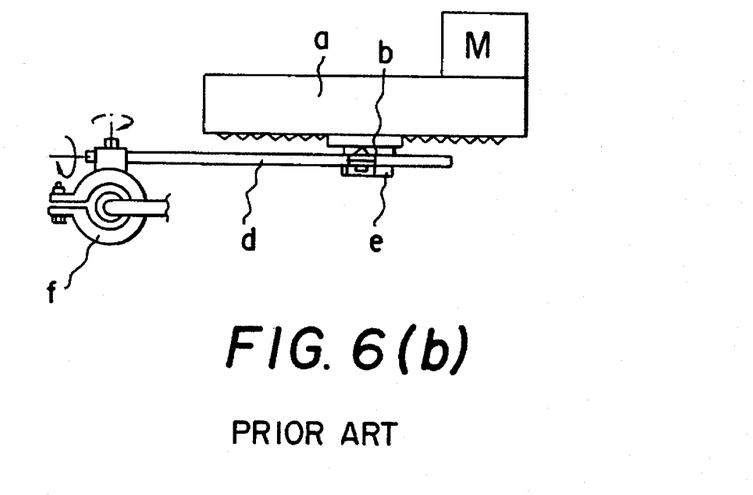

According to FIGS. 6(a) and 6(b) a straight weaving weaver is shown in which a slider b is capable of moving to the right and left on a main body. A projected shaft c is formed on slider b. A connecting means e having an extending arm d is inserted into the projected shaft c and a clamp f is provided at an end of the extended arm d. A welding torch g is held by the clamp f so that when the slider b is driven by an electric motor M, to the right and left, the welding torch moves to the right and left, accordingly.

Figure 7A:
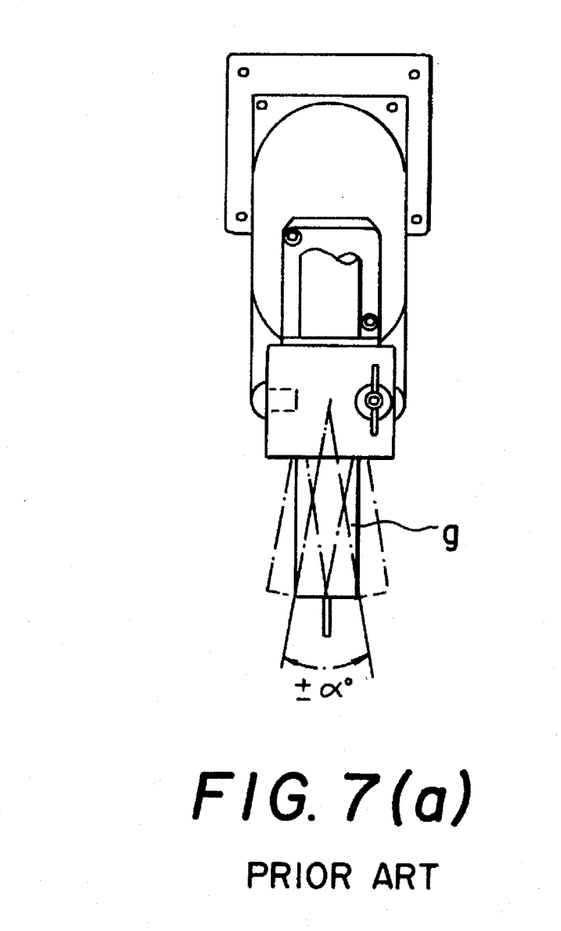
FIGS. 7(a) and 7(b) are front and plane views, respectively, showing a conventional angle weaving exclusive use device.
Figure 7B:
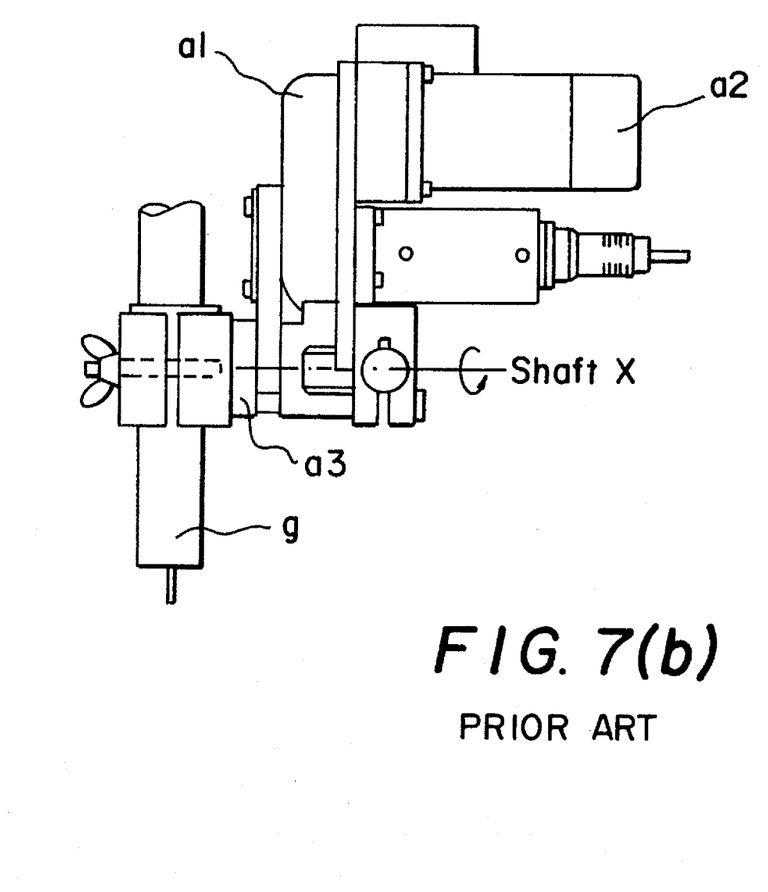
Figure 8A:
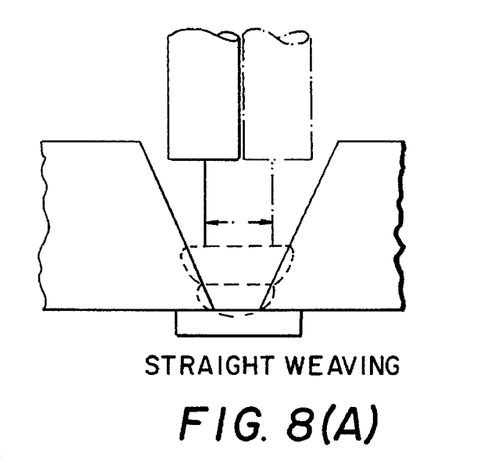
FIGS. 8(a), 8(b), 8(c) and 8(d) are conceptual drawing illustrating the present invention definitions for the function of an apparatus of the present invention.
Figure 8B:
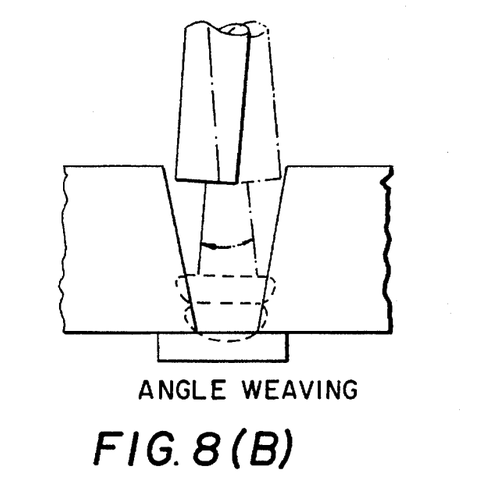
Figure 8C:
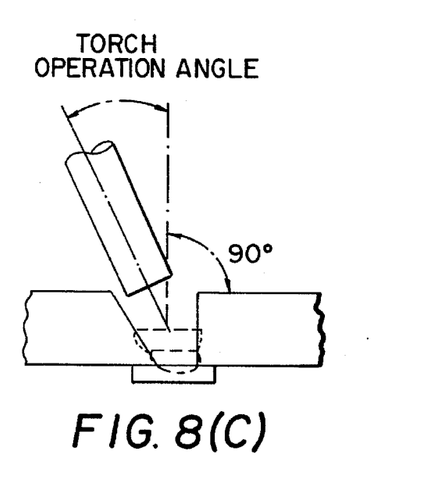
Figure 8D:
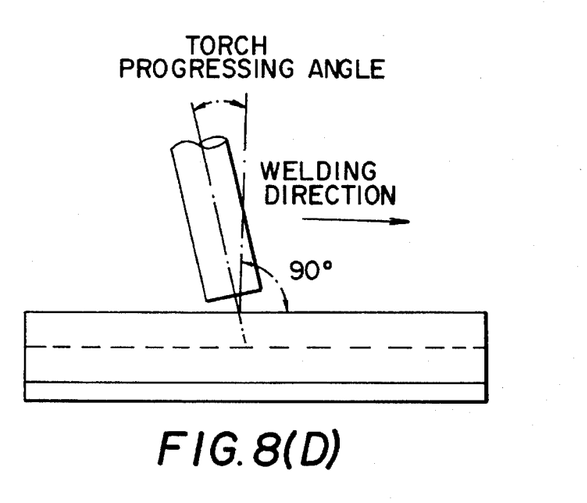

In accordance with a drawing shown in FIGS. 7(a) and 7(b) rotary shaft $a_3$ rotate by an angle of ± to the right and left around a rotary shaft X by means of an electric motor $a_2$ attached to the main body $a_1$. A torch clamp $a_4$ is provided on an end of the rotary shaft, X. A angular weaving weaver provided with a welding torch g to the clamp $a_4$, is used when intending to improve the welding condition in which a welding portion is narrow or a welding-in of the right and left periphery portion of the welding portion is uncertain such as when processing an interior weld of the narrow groove.

As shown in FIGS. 8(a), 8(b), 8(c) and 8(d), although the optimum torch weaving necessary condition is changed in accordance with the characteristic of the welding portion in the same working place and the same matter to be welded, it was impossible to use by selecting a weaving shape in accordance with welding characteristic of a matter to be welded, and to secure all of angular weaving and straight weaving which are a welding torch weaving apparatus of high price as an extra and to selectively use in accordance with weaving shape are not only unreasonable but since the welding work should be discontinued at every time during a time of changing the weaver, it has been a factor of deterioration of welding productivity.

OBJECT AND SUMMARY OF THE INVENTION

The present invention is invented to improve and complete these by considering such various problems as above. A major object of the present invention is to make a straight weaving weaver and an angular weaving weaver operable by a sole operator by attaching an auxiliary means to a structure of the straight weaving weaver. Another object of the present invention is to provide a weaver for a welding torch capable of straight weaving and angular weaving which renders not only easy execution without inconvenient operation change process, such as separating the welding torch from the weaver, even when changing a torch operation angle while also to be able to voluntarily change of a weaving width and a weaving angle of a practical welding torch end.

A characteristic structure for this is constructed by: a slider which is movable to the right and left in response to a main body and which has a rotary shaft projecting from a front surface thereof and which has a fixing bolt for suppressing the rotation of a rotating plate; a torch operation angle adjusting mechanism which has a rotating plate being inserted into a rotary shaft of the slider so as to be rotated, and a torch clamp at a middle portion by being extended below the rotating plate, and a vertical lever having a hinge shaft at an end; and a torch angle fixing mechanism which is made by a bracket attached to one side of the main body, a connecting lever connected by a butterfly bolt at bottom portion of the bracket, and a horizontal lever connected between a hinge shaft residing at an end of the bottom portion of the connecting lever and the hinge shaft of the vertical lever; so that the butterfly bolt is loosely unscrewed and the rotating plate is rotated and the torch angle is adjusted, the bracket and the connecting lever connected to the bottom portion of the bracket are fixed so as not to move by tightening the butterfly bolt so as to set a torch operation angle and then, when the slider is woven to the right and left by the electric motor, the torch does an angle weaving to the right and left directions around the hinge axle of the vertical lever end so as to make a weaving angle and an weaving width of the torch end to be increased or decreased in proportion to the adjustment of the right and left weaving width of the slider.

DETAILED DESCRIPTION OF THE INVENTION

Hereinafter, the detailed structure, operation and effect of the present invention will be described in more detail with reference to the accompanying drawings.

Figure 1A:
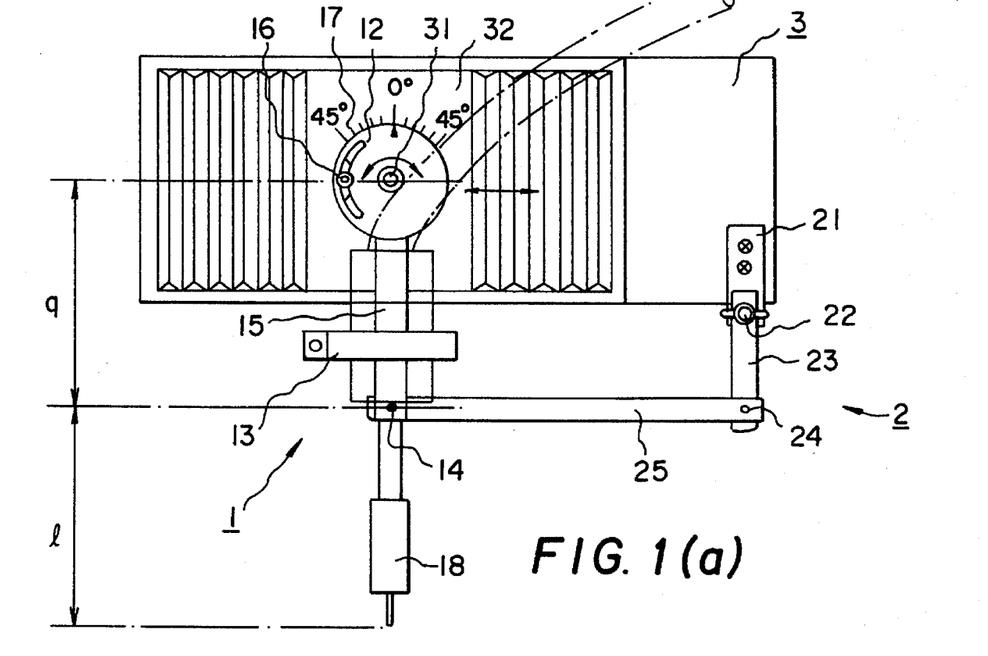
FIGS. 1(a) and 1(b) are front view and plane view, respectively, showing the structure of the present invention.
Figure 1B:
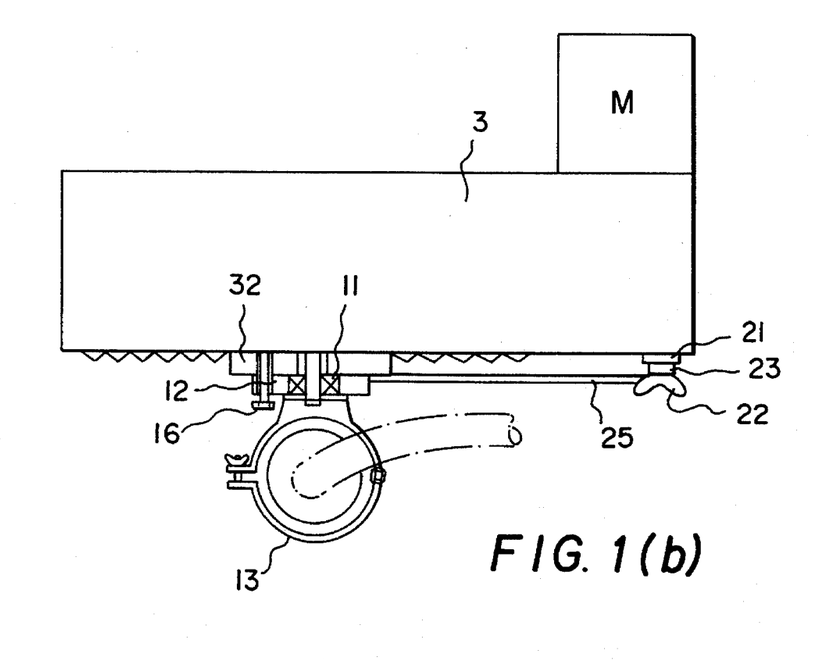

FIGS. 1(a) and (b) are a front view and plane view, respectively, showing the structure of the present invention, in which a torch operation angle adjusting mechanism 1 and a torch angle fixing mechanism 2 are shown.

A slider 32 has a rotary shaft 31 at a front surface thereof which is movable to the right and left in response to a main body 3. This is substantially the same as a conventional device.

In the present invention, however, a torch operation angle adjusting mechanism 1 is provided on the rotary shaft 31 projected from the front surface of the main body 3. A rotating plate 12 is provided around a shaft in order to be capable of rotating by means of being interposed on a bearing 11. A torch clamp 13 is located at a middle portion so as to be extended elevationally below the rotating plate 12. A vertical lever 15 has a hinge 14 and is integrally attached to an end of the bottom portion.

Above described rotating plate 12 has a slot hole of arc shape so as not to be abraded in case of not tightening a fixing bolt 16 when doing a torch operation angle adjustment and an angle weaving, and the fixing bolt 16 assembled by a screw to the slide 32 makes the rotating plate 12 unrotatable by becoming fixed to the slide 32 by tightening the fixing bolt 16 when doing a straight weaving.

Scale 17 for indicating the vertical and rotating angles is indicated on the surface of the peripheral slide 32 of the rotating plate 12.

And, at one side of the main body, there is provided a torch angle fixing mechanism 2 related to the vertical lever 15.

That is, the torch angle fixing mechanism 2 is made of: a bracket 21 fixedly attached to one side of the main body 3, a connecting lever 23 connected by a butterfly bolt 22 at a bottom portion of the bracket, and a horizontal lever 25 connected between a hinge 24 residing at a bottom end of the connecting lever and a hinge shaft 14 of the vertical lever. The torch angle fixing mechanism 2 relation to the torch operation angle adjusting mechanism 1.

Figure 2A:
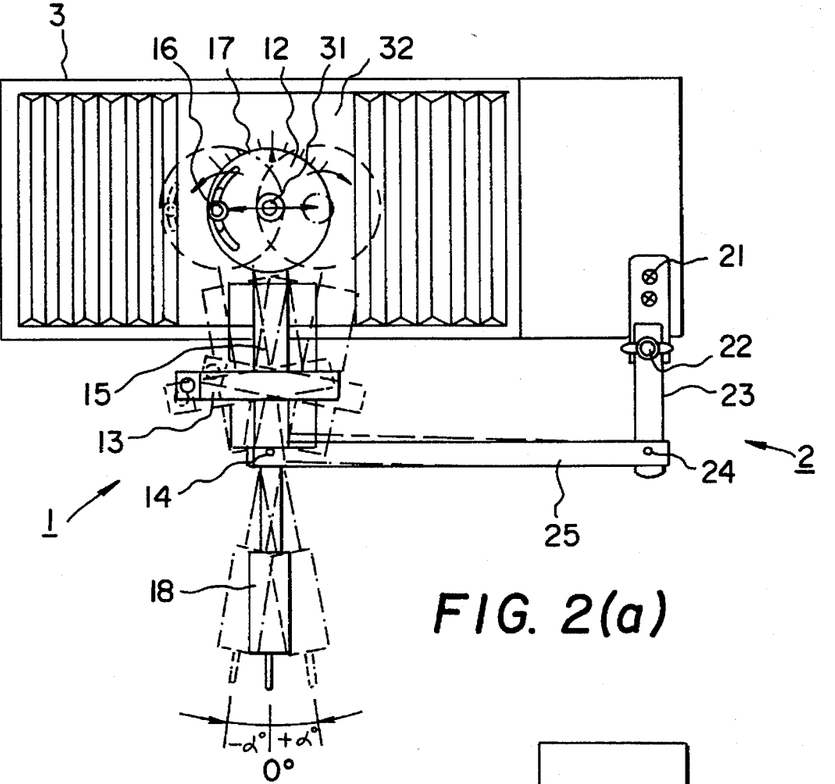
FIGS. 2(a) and 2(b) are front and plane view, respectively, showing an angle weaving state of the present invention.
Figure 2B:
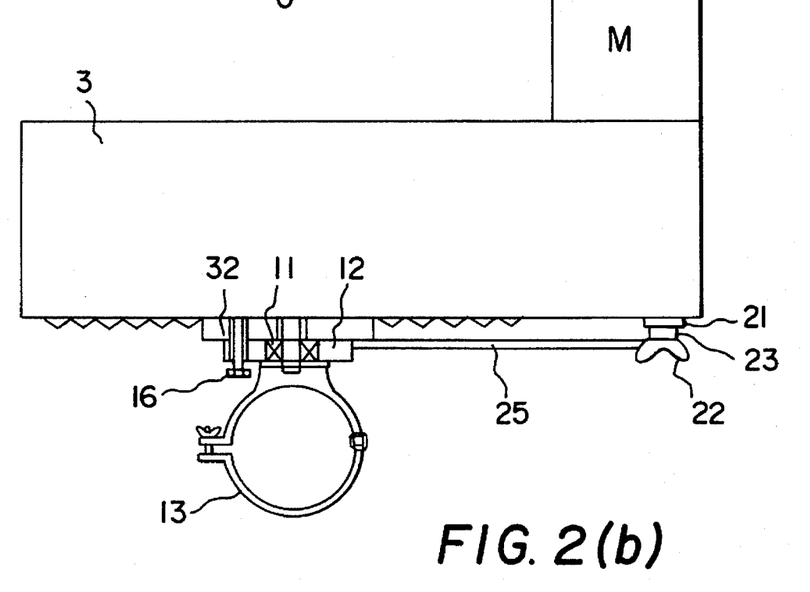

For the torch operation angle adjusting mechanism 1, as shown in FIGS. 2(a) and 2(b), a butterfly bolt 22 and a fixing bolt 16 on the rotating plate 12 are first loosely unscrewed in order to rotate through an angle of ± or on a basis of 0°. Then, an angle indicating arrow of the rotating plate 12 is set to 0° on scale 17 by rotating the rotating plate 12. Then, the butterfly bolt 22 is securely tightened so that the connecting lever 23 does not move on the bracket 21.

And, when the slider 32 is moved to the right and left, a straight weaving of the slider 32 appears to be changed to an angle weaving of a° at a welding torch end.

Thus, a conception in which the straight weaving is changed to an angle weaving, as seen in FIGS. 1(a) and 1(b), becomes varied in accordance with an upper side inter-shaft distance q between the hinge shaft 14 and the rotating shaft 31 of the rotating plate 12 and a lower side inter-shaft distance 1 between a wire end of a welding torch 18 and the hinge shaft 14. The result is that when the upper side inter-shaft distance q is smaller than the lower side inter-shaft distance 1, an angle weaving width becomes larger than a straight weaving width and simultaneously a weaving speed becomes fast. Contrarily, when the lower side inter-shaft distance 1 is smaller than the upper side inter-shaft distance q, the angle weaving width becomes narrower than the straight weaving width and simultaneously a weaving speed becomes slower. When the inter-shaft distance ratio (q/l) becomes bigger than 1 on the basis of the same angle weaving width, an angle of the weaving angle ±α becomes bigger, and when the inter-shaft distance ratio (q/l) becomes smaller than 1, an angle of the weaving angle ±α becomes smaller.

Thus, the upper side inter-shaft distance q, becoming a basis of variation of maximum weaving width and proper weaving angle variation of same weaving width requiring an adjustment in accordance with the operation characteristic, has a fixed value in accordance with a position of the hinge shaft 14 against the weaver main body 3, and the lower side inter-shaft distance 1 is varied in accordance with a position fixing the welding torch 18 to the torch clamp 13.

Accordingly, when the welding torch 18 is position fixed to the torch clamp 13, an adjustment range of the maximum weaving width as well as the weaving angle can be easily varied, and a state of the weaving angle, during the angle weaving operation can be read on scale 17.

When an operator intends to change the weaving method from the angle weaving to the straight weaving, the butterfly bolt 22 is loosely unscrewed and the connecting lever 23 is made to be free without being fixed to the bracket 21. The rotating plate 12 is rotated and an operating angle of the welding torch is set. Then, the fixing bolt 16 assembled by a screw to the slide 32 is tightened so as to make the rotating plate 12, unrotatable on the slider 32

Figure 4A:
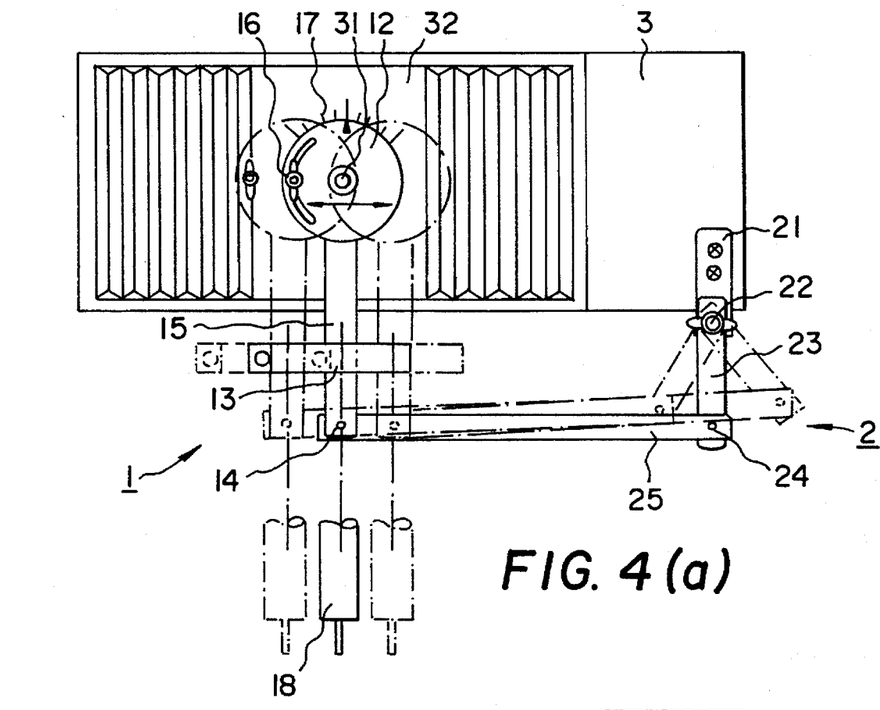
FIGS. 4(a) and 4(b) are front and plane views, respectively, showing a vertical weaving operation state of the present invention.
Figure 4B:
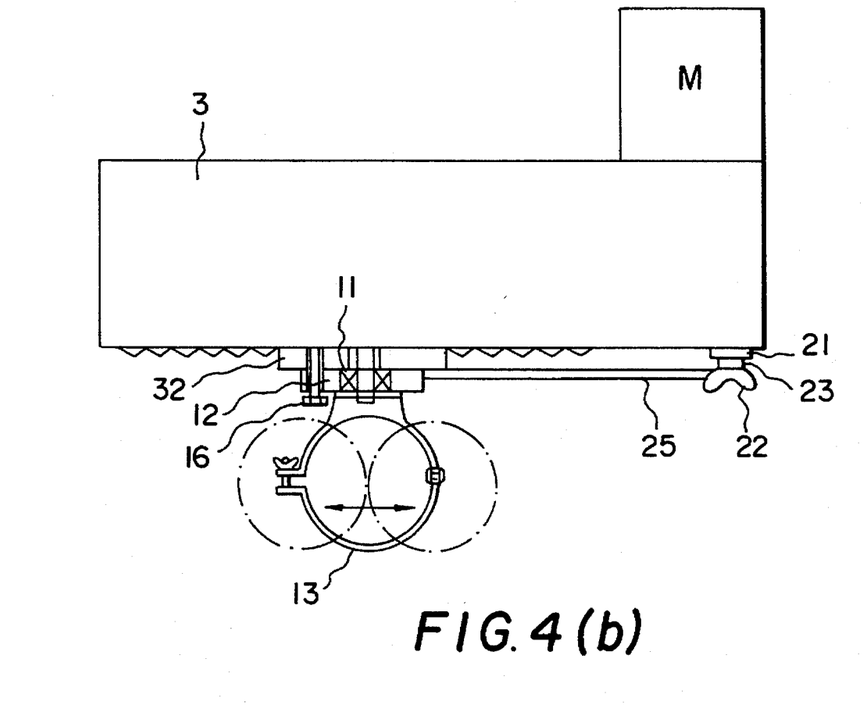

When done as above described and as seen in FIGS. 4(a) and 4(b) angle of the welding torch 18, remains unchanged and is moved only to the right and left when the slider 32 moves to the right and left directions. Each connecting portion of the torch angle fixing mechanism 2 becomes free to move.

Figure 3A:
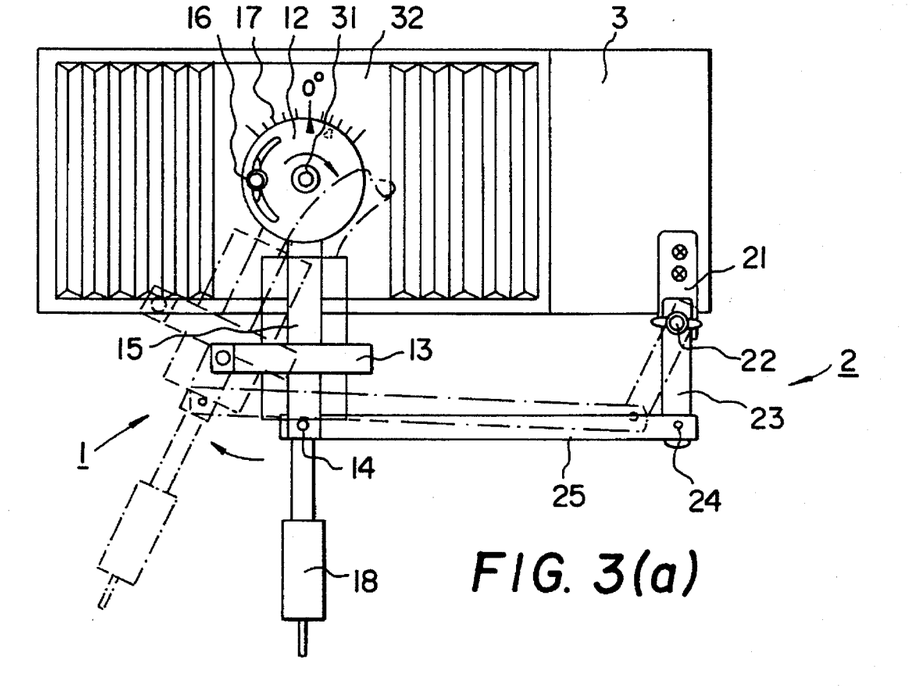
FIGS. 3(a) and 3(b) are front and plane views, respectively, showing a torch angle adjusting mechanism of the present invention.
Figure 3B:
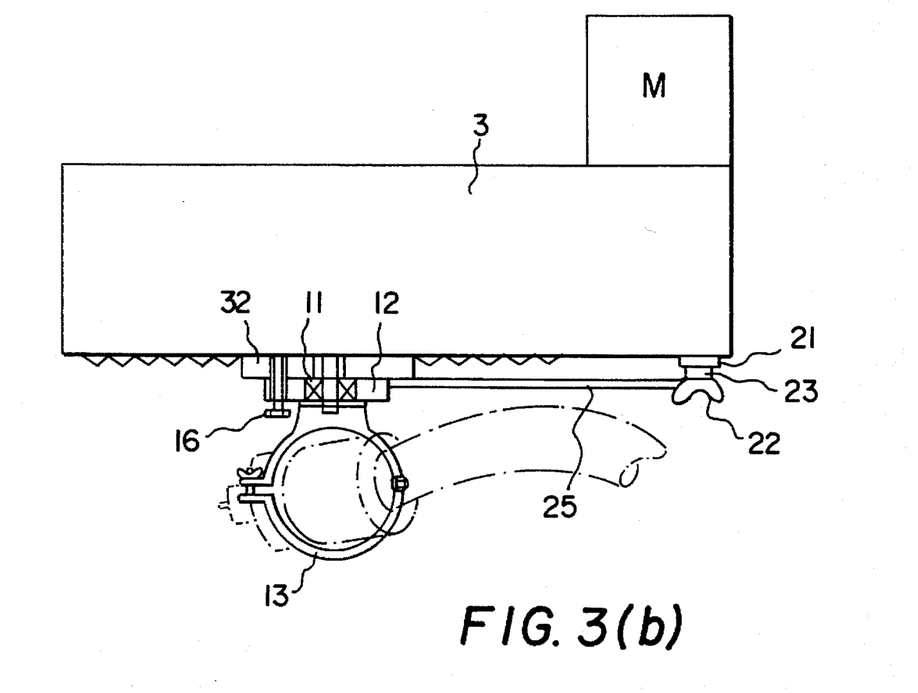

On the other hand, the present invention, as shown in FIGS. 3(a) and 3(b) also operates in the case when the angle of the welding torch 18 is voluntarily set at about 20° and it is intended to execute an angle weaving of 20°±a° α.

In this case, when the butterfly bolt 22 and the fixing bolt 16 of the rotating plate are loosely unscrewed and the rotating plate 12 is rotated whereby a reference scale of the rotating plate is set to be accorded with 20° of the angle scale of the slider 32 as shown in FIGS. 3(a) and 3(b) and then the butterfly bolt 22 is securely tightened and the connecting lever 23 is made to be fixed to the bracket 21, the welding torch 18 becomes inclined by as much as the angle shown by the dotted line of the drawing FIG. 3(a).

In this state, when like as the end of the welding torch 18 is changed to an angle weaving of ±° when the slider 32 is moved to the right and left as shown in FIGS. 2(a) and 2(b), when the slider 32 is moved to the right and left in FIGS. 3(a) and 3(b) also, the straight weaving of the slider becomes an angle weaving of 20°±α° on a basis of a set angle 20° of the welding torch 18, and when there is a weaving center moving function as a standard function of the straight weaver, the reference angle of the welding torch 18 can be adjusted to 20°±a° direction by a weaving center right and left adjustment of the straight weaver during welding.

Figure 5A:
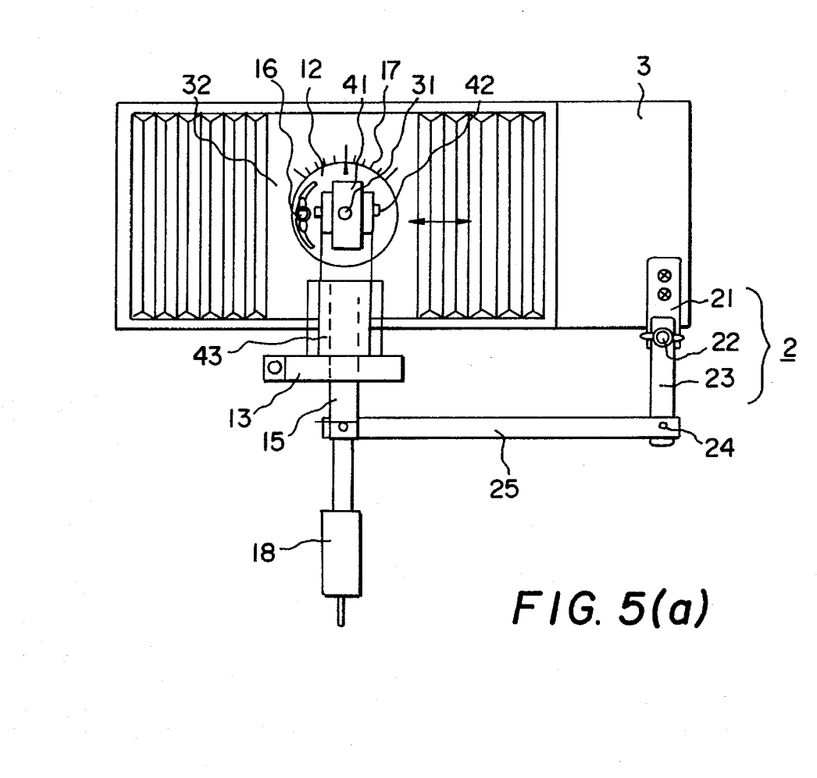
FIGS. 5(a) and 5(b) are front and plane views, respectively, of a torch progressing angle adjusting mechanism showing a second embodiment of the present invention.
Figure 5B:
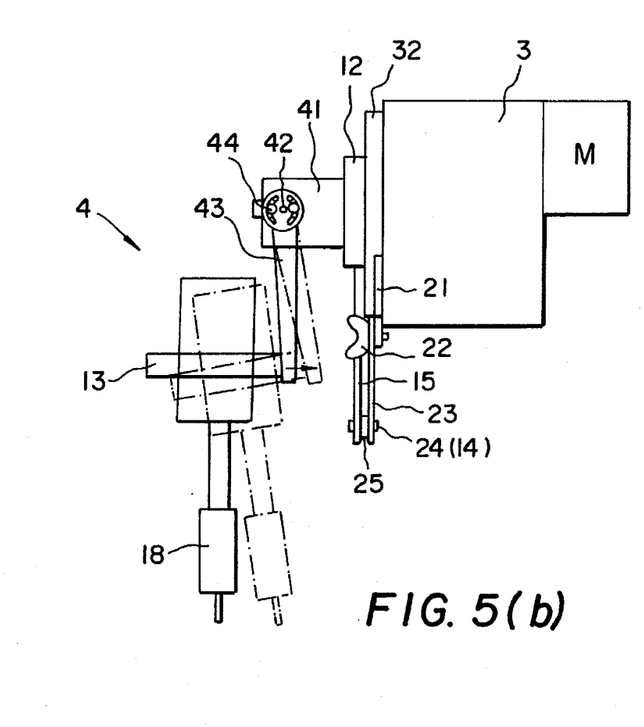

The present invention can be used by adding another embodiment as shown in FIG.5.

That is, it is to provide a torch processing angle adjusting mechanism 4, which is made such as shown in a front view and side view of FIGS. 5(a) and 5(b), a projected member 41 attached to a front surface of the rotating plate 12 and a forward vertical lever 43 which is connected to an end of the projected member and capable of rotating to the front and back by a lateral shaft 42 is provided. The torch clamp 13 is provided on its end so that the front and back angle adjustment is possible.

The torch progressing angle adjusting mechanism 4 has a wrench bolt 44 for suppressing the angle change after setting the torch progressing angle, and has a scale indicating a reference scale and the torch progressing angle, and the forward vertical lever 43 rotates to the right and left of vertical whereby an angle setting is possible.

The present invention described in detail as above, can perform both straight weaving and angle weaving by a sole weaver by utilizing the torch operation angle adjusting mechanism 1, the torch progressing angle adjusting mechanism 4 and the torch angle fixing mechanism 2. On the other hand, in the case of also changing the weaving shape, not only can the work be easily executed without separating the welding torch from the weaver as in the prior art, but also the weaving width and the weaving angle of a practical welding torch end can be voluntarily changed within a range of the weaving stroke of the straight weaver, and hence it is a very useful invention.

What is claimed is:

1. A weaver for a welding torch wherein said welding torch has an increased productivity due to said weaver's capability of performing both straight weaving and angular weaving techniques without having to discontinue welding to change from a weaver solely for straight weaving to a weaver solely for angular weaving and vice versa, said weaver comprising:

a main body having a front surface;

a slider (32) slidably mounted on said front surface of said main body and movable to the right and left of an original resting position on said main body; (3)

a rotary shaft (31) extending perpendicularly outwardly from said front surface of said main body and a front surface of said slider;

a torch operation angle adjusting means for adjusting a torch operation angle, said torch operation angle adjusting means including an rotating plate having a central aperture so that said rotating plate is bearing mounted around said rotary shaft (31) for rotation of said rotating plate about said rotary shaft, a first vertical lever(15) having two ends with a first end attached to said rotating plate and a second end having a hinge shaft, said first vertical lever extending radially outwardly from said rotary shaft (14) and a torch clamp attached to said first vertical lever and extending perpendicularly outwardly from said first vertical lever at a elevation so as to be located entirely below said front surface of said main body and a front surface of said rotating plate;

a fixing bolt for fixing a back surface of said rotating plate to said front surface of said slider so as to prevent rotation of said rotating plate when said fixing bolt is tightened;

a torch angle fixing means (2) for fixing a torch angle, wherein said torch angle fixing means includes a bracket (21) attached to said front surface of said main body (3), a connecting lever (23) connected by a butterfly bolt (22,) at a bottom portion of said bracket (21), and a horizontal lever (25) connected between a hinge shaft (24) at one end of a bottom portion of said connecting lever (23) and said hinge shaft (24) of said first vertical lever (15), wherein said torch operation angle adjusting means and said torch angle fixing means are used together simultaneously side-by-side each other so that any combination of adjustment of said torch angle as well as said straight weaving technique and angle weaving technique may be accomplished.

2. The weaver for a welding torch as defined in claim 1, comprising:

a projected member (41) attached to a front surface of said rotating plate (12); and a torch progressing angle adjusting means (4) for adjusting a torch progressing angle, said torch progressing angle adjusting means including a second vertical lever (43), located forwardly of said first vertical lever and connected to an end of said projected member so that a lateral shaft may rotate forwards and backwards, and said torch clamp (13) extends from said second vertical shaft forwardly of said projected member, so that adjustment of both a forward and backward torch angle can be accomplished.

* * * * *